(12) United States Patent  
Miller

(10) Patent No.: US 12,103,621 B2
(45) Date of Patent: Oct. 1, 2024

(54) ELECTRIC VEHICLE BATTERY SUPPORT AND TRANSPORT ASSEMBLIES

(71) Applicant: NORCO INDUSTRIES, INC., Compton, CA (US)

(72) Inventor: David G. Miller, Chino, CA (US)

(73) Assignee: NORCO INDUSTRIES, INC., Compton, CA (US)

( * ) Notice: Subject to any disclaimer, the term of this patent is extended or adjusted under 35 U.S.C. 154(b) by 801 days.

(21) Appl. No.: 17/178,777

(22) Filed: Feb. 18, 2021

(65) Prior Publication Data

US 2021/0253189 A1 Aug. 19, 2021

Related U.S. Application Data

(60) Provisional application No. 62/978,485, filed on Feb. 19, 2020.

(51) Int. Cl.
*B23P 19/00* (2006.01)
*B62B 3/02* (2006.01)
*B62B 5/00* (2006.01)
*B62D 65/02* (2006.01)
*H01M 50/256* (2021.01)

(52) U.S. Cl.
CPC ............ *B62D 65/022* (2013.01); *B62B 3/022* (2013.01); *B62B 5/0086* (2013.01); *H01M 50/256* (2021.01); *B62B 2202/61* (2013.01)

(58) Field of Classification Search
CPC .............. B62D 65/022; H01M 50/256; H01M 2220/20; B62B 5/0086; B62B 3/008; B62B 3/022; B62B 3/04; B62B 3/10; B62B 2203/10; B62B 2206/06; B62B 2202/61; Y02E 60/10
See application file for complete search history.

(56) References Cited

U.S. PATENT DOCUMENTS

| | | | | |
|---|---|---|---|---|
| 4,120,411 A | * | 10/1978 | Johnson | .................... B62B 3/10 104/235 |
| 6,357,070 B1 | * | 3/2002 | Venard | .................... A47L 11/28 180/68.5 |
| 8,084,993 B1 | * | 12/2011 | Wong | ........................ B62B 3/04 320/109 |
| 9,850,114 B2 | * | 12/2017 | Gilland | .................. B66F 9/0754 |
| 2018/0370377 A1 | * | 12/2018 | Blacksberg | .......... G05D 1/0225 |

* cited by examiner

*Primary Examiner* — Paul D Kim
(74) *Attorney, Agent, or Firm* — Vorys, Sater, Seymour and Pease LLP; Mark A. Watkins

(57) ABSTRACT

The present disclosure is directed to battery cart for transporting large and heavy electric car batteries. The cart includes a pair of independently movable and positionable cart half assemblies, with each cart half assembly having a pair of battery supports that are slidably positionable and lockable along a center crossbar. Each support includes height adjustable columns. The cart assemblies therefore, are adjustable to support batteries of varying sizes as well as positioning a supported battery to desired height, facilitating repairs to, and transport of, the electric car battery.

15 Claims, 9 Drawing Sheets

ELECTRIC VEHICLE BATTERY SUPPORT AND TRANSPORT ASSEMBLIES

CROSS-REFERENCE TO RELATED APPLICATIONS

This application claims priority to and the benefit of U.S. Provisional Patent Application No. 62/978,485 filed Feb. 19, 2020, the disclosure of which is hereby incorporated by reference herein in its entirety.

BACKGROUND

There is a current trend toward electrifying transportation, i.e., using rechargeable batteries and electric motors instead of the internal combustion engine for providing the mobility of a vehicle, as well as electrifying other technologies. However, over time and with use, a rechargeable battery degrades, reducing the energy capacity, power and efficiency. As the capacity of a rechargeable electric car battery diminishes, the range of the electric vehicle is limited. Other factors may increase the degradation rate of a battery including subjecting the battery to heat, extreme temperature changes, and erratic charging, to name a few. Thus, it is likely that a battery of an electric vehicle may need replacement before the rest of the vehicle has reached the end of its service life.

The battery of an electric vehicle (EV) is generally one of the vehicle's heavier components, often weighing well over 800 lbs. The large weight and size make removal and replacement of the EV battery physically cumbersome and difficult. This often requires the use multiple large pieces of equipment in a repair/replacement facility. For example, EV battery removal may require the electric vehicle to be lifted on a vehicle lift such that the EV battery, often placed on the underside of the vehicle, may be accessed by a technician from underneath the vehicle. Typically, a scissor lift is positioned under and vertically extended so as to reach the battery of the elevated vehicle. Once the EV battery is unsecured, the EV battery is lowered via the scissor lift and removed from the immediate area of the vehicle. In some facilities, the EV battery is later secured to a mobile hoist in order to free the availability of the scissor lift so that the scissor lift is able to be used for other procedures in other parts of the repair facility, e.g., to place a replacement battery into the elevated vehicle. However, in these cases, further use of the large mobile hoist is now prevented due to its use a mobile transport for an EV battery. Furthermore, transporting the heavy EV battery around a repair/replacement facility by the large mobile hoist is difficult due to the large footprint of typical mobile hoist equipment.

The EV battery may be transferred from a mobile hoist onto a smaller mobile cart for transportation and storage around the repair/replacement facility. Some scissor lift configurations may also be able to transfer the EV battery directly onto the mobile cart without needing to utilize a mobile hoist. However, due to the varying sizes and configurations of EV batteries, there no universal cart designed to transport each of the variety of existing (and future) EV batteries.

U.S. Pat. No. 9,358,895 entitled "Quick Loading and Unloading Battery System for Vehicles" discloses a battery ferrying vehicle including a lift for transporting an electric vehicle battery. The ferrying vehicle includes horizontally lifting forklift arms that lift and hold the battery in a vertical direction. This design suffers from drawbacks in that the footprint of the ferrying vehicle is large and the "cart" is not adjustable to accommodate electric car batteries of varying physical dimensions, rather the static configuration of the cart necessitates that the battery form factor be consistent.

Accordingly, a need exists for a battery transport and storage device, including but not limited to, an adjustable battery cart configured to support a variety of EV batteries, allowing for the EV battery to be easily transported or worked on, as well as a cart that occupies little storage space when not in use by a repair/replacement facility.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In accordance with one aspect of the present disclosure, described herein are exemplary battery cart assemblies for supporting and transporting EV batteries. The cart assemblies include a pair of battery supports that are slidably positionable and lockable along a crossbar. Each support may include height adjustable columns configured to raise and lower a connected support platform to a desired height. The cart assemblies therefore, are adjustable to support and transport batteries of varying sizes and configurations facilitating repairs to, and transport of, the electric car battery. The battery cart assemblies include a first cart side assembly comprising two spaced apart battery supports movably positionable on a first crossbar, each battery support configured to receive and support an electric vehicle battery and a second cart side assembly, independently movable from the first side assembly comprising two spaced apart battery supports positionable on a second crossbar.

In a further embodiment, the first cart side assembly is configured to support an electric vehicle battery on a first battery side and the second cart side assembly is configured to support the electric vehicle battery on a second battery side. In another further embodiment, each battery support further includes a base, a top platform, and support column connecting the base to the top platform. In another further embodiment, the first crossbar interconnects or extends between the support columns of the first cart side assembly and the second crossbar interconnects or extends between the support columns of the second cart side assembly. In another further embodiment, each top platform further includes a locator pin extending substantially normal from the top platform, the locator pin is dimensioned to engage and align a corresponding aperture of the electric car battery. In another further embodiment, each top platform further includes at least one top wall extending in a substantially vertical direction from the top plate and is configured to abut an edge wall of the EV battery. In another further embodiment, each battery support includes a telescoping support column, the telescoping support column including an inner column dimensioned and configured to fit in a sliding engagement with an outer column. In another further embodiment, the electric vehicle battery cart assembly further includes a support pad on a top surface of the top platform, the support pad composed of an elastomeric or electrically insulating material. In another further embodiment, each battery support includes a set of three, spaced apart casters. In another further embodiment, the set of three casters are in a spaced apparat tri-pod arrangement. In another further embodiment, the first side assembly is a mirror image of the second side assembly. In another further embodiment, each support includes a base having a first axial portion along a first axis, the first axis is substantially parallel to the crossbar and a second axial portion extending along a second axis, the second axis extends at an angle to the first axis. In another further embodiment, the second axial portion is perpendicular to the first axial portion. In another further embodiment, a first and second caster are mounted to a bottom surface of the base along the first axis and a third caster is mounted to the bottom surface of the base along the second axis. In another further embodiment, the base has an interior edge substantially parallel to the crossbar.

In accordance with another aspect of the present disclosure, described herein is an exemplary method for removing an electric vehicle battery from a vehicle. The exemplary method includes positioning a first cart side assembly under a first side of the electric vehicle battery, the first cart assembly comprising two spaced apart battery supports movably positionable on a first crossbar, each battery support configured to receive and support the electric vehicle battery and positioning a second cart side assembly under a second side of the electric vehicle battery, independently movable from the first side assembly comprising two spaced apart battery supports positionable on a second crossbar. In a further embodiment, the method includes lowering the electric vehicle battery with lift equipment from a raised position to a position resting on each of the battery supports of the first and second cart side assembly. In another further embodiment, the method further includes continue lowering the lift equipment, until the lift table of the lift equipment is no longer in contact with the electric vehicle battery. In another further embodiment the method further includes removing the lowering the lift equipment from underneath the vehicle battery supported by the first and second side assemblies. In another further embodiment, the method includes aligning a locator pin on the top of each battery support with a corresponding locator hole of the electric vehicle battery.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1A:
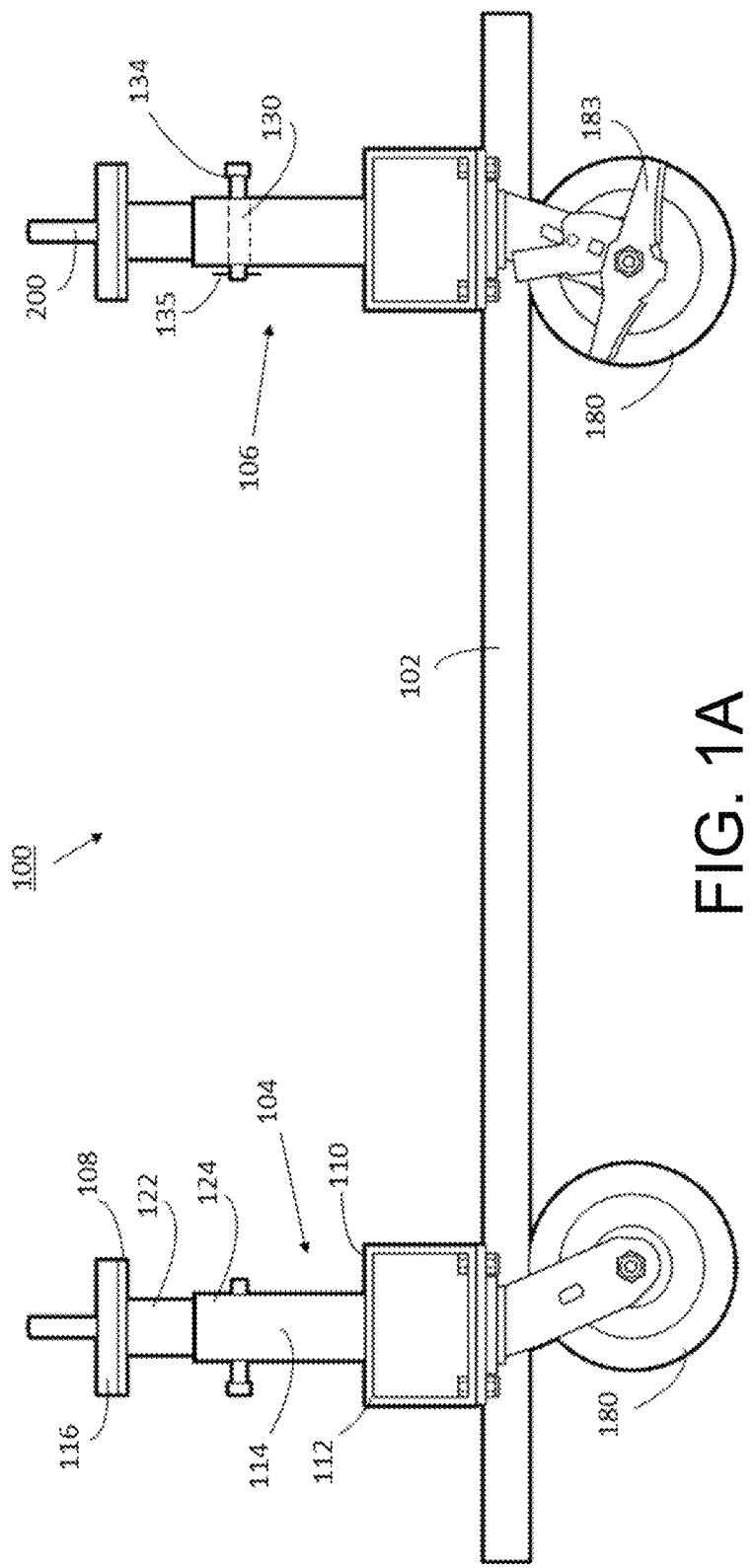
FIG. 1A illustrates a side view of an exemplary battery cart side assembly in accordance with the present disclosure.

A more complete understanding of the components, processes and apparatuses disclosed herein can be obtained by reference to the accompanying drawings. These figures are merely schematic representations based on convenience and the ease of demonstrating the present disclosure, and are therefore not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

As used herein, the terms "generally" and "substantially" are intended to encompass structural or numerical modifications which do not significantly affect the purpose of the element or number modified by such term.

Figure 1B:
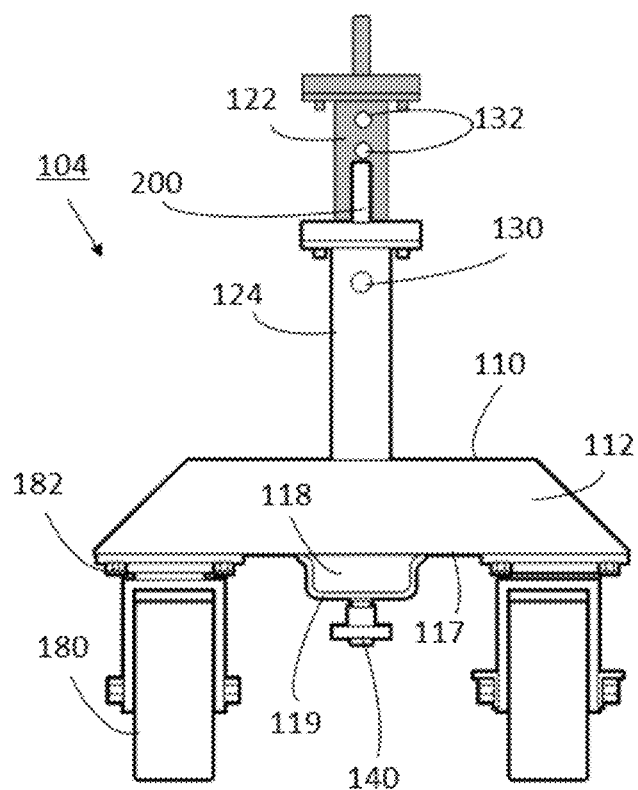
FIG. 1B illustrates a front view of the battery cart side assembly of FIG. 1A.
Figure 1C:
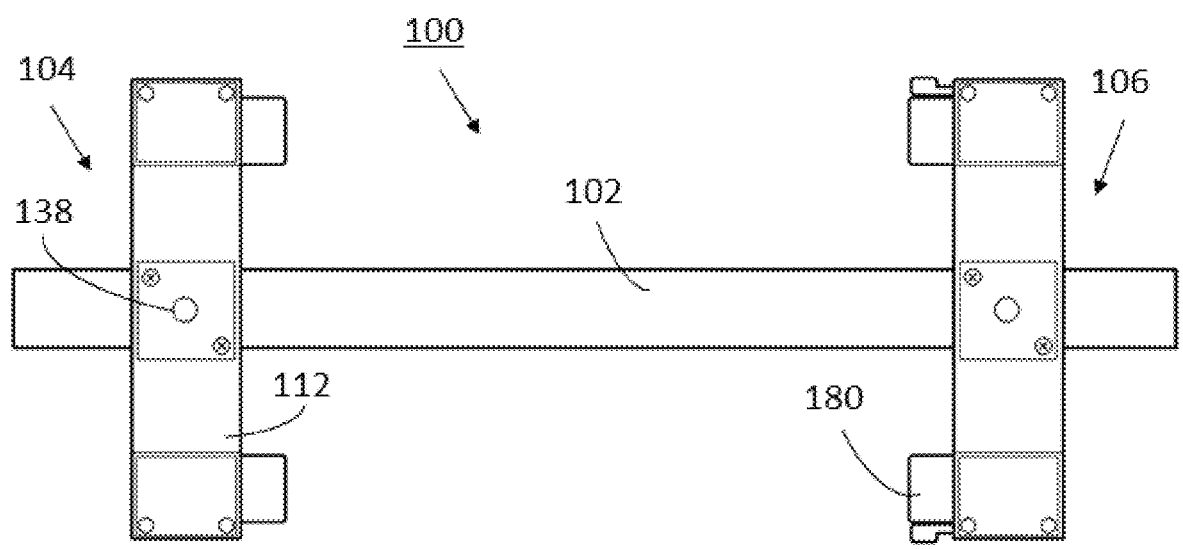
FIG. 1C illustrates a top view of the battery cart side assembly of FIG. 1A.

Described herein is a battery cart comprised of at least two independently movable side assemblies configured to support a variety of EV batteries, allowing for the EV battery to be easily transported. With reference to FIGS. 1A-C, illustrated is an exemplary embodiment of an electric battery cart side assembly 100 ("side assembly") for such a battery cart configured to transport large and heavy electric batteries, for example, from electric vehicles. Generally, side assemblies 100 are used in pairs to support and transport an EV battery, where each side assembly 100 is independently movable relative to the other. That is, each side assembly 100 may be positioned on opposite sides of a vehicle lift and then quickly and easily moved into position under a left and right side of an EV battery that is being lowered down (on a lift) from beneath a vehicle. After the EV battery is positioned on the two side assemblies 100, the lift may continue being lowered once it (i.e., the lift) no longer supports the battery and the battery cart (two side assemblies 100), which now supports and bears the battery load, may be moved elsewhere in a shop to transport the EV battery to another location. The various components of the battery cart and its side assemblies 100 are generally composed of structurally rigid materials (except as otherwise provided herein) including by not limited to metal, and, in some embodiments, they are made of steel, e.g., stainless steel.

Each side assembly 100 includes a rigid crossbar 102 that spans and removably connects at least two, spaced apart battery supports 104 and 106. The spacing of the battery supports 104, 106 is based on the dimensions of the EV battery it is configured to support. The position of the battery supports 104, 106, may be adjustable (and positionable or movable) along a length of the rigid crossbar 102, so that the side assembly 100 may accommodate EV batteries of different sizes.

The battery supports 104 and 106 each include, a top platform 108, an elongated base 112, and a support column 114. The support column 114 is connected to both the top platform 108 and elongated base 112, thus the support column 114 thereby interconnects the top platform 108 and elongated base 112 together. The elongated base 112 having a long (major) axis that is substantially perpendicular to a long (major) axis of the crossbar 102. The column 114 is generally normal to a substantially planer top surface 110 of the base 112. In some embodiments, the column 114 is attached to the elongated base 112 by fasteners, e.g., bolts. In other embodiments, the column 114 is attached to the base 112 by welding or other attachment means and methods known in the art. In the illustrated example, the crossbar 102 is connected to the battery supports 104 and 106 at a location underneath the elongated bases 112, for example, at a lower planar surface 117 (i.e., the bottom surface 117) of the elongated bases 112, but it may be differently connected to the battery supports 104, 106, for example, along the support columns 114.

In the exemplary embodiment of FIGS. 1A-C, the support columns 114 are telescoping support columns. That is, the support columns 114 each include an inner column 122 dimensioned and configured to fit in a sliding relationship into a channel of with an outer column 124 (or sleeve 124). As shown in FIGS. 1A-1B, the outer column 124 is secured to the base 112, while the inner column 122 is connected to and supports the top platform 108. In the illustrated example, both the inner column 122 and the outer column 124 have a rectangular outer surface and an internal cavity, defined by a generally rectangular interior surface. However, it is to be understood that any cross-sectional configuration of a column 114 may be used, for example and without limitation cylindrical, oval, triangular, square or rectangular, hexagonal, etc., so long as an outer diameter of the inner column 122 is slightly less than an inner diameter of the outer column 124. In this way, the inner column 122 telescopically engages the outer column 124. The adjustable height columns 114 allow a supported battery (e.g., EV battery 300 of FIG. 4) to be positioned at a desirable height, such that a repair technician may easily access components of the EV battery, facilitating any needed repairs.

The outer column 124 may be further provided with a through aperture 130 dimensioned to receive a pin 134. The inner column 124 may be further provided with a plurality of holes 132 serially positionable in axial alignment with the aperture 130. Each hole 132 is also dimensioned to receive and thereby allow the pin 134, to engage the wall of the outer column 124. In other words, an inner column 124 includes multiple holes 132 so it may be raised or lowered to multiple heights (each hole 132 corresponding to a predetermined height) and then be pinned/secured at the desired height with the pin 134 extending through both aperture 130 of the outer column 124 and selected hole 132. The pin 134 may also be configured to receive a cotter pin 135 that prevents the pin 134 from disengaging the aperture 130.

Moreover, the device used to secure the inner column 122 and outer column 124 together is not limited to the use of a pin 134, but could include any type of device that would enable the inner column 122 to be in a secured relationship with the outer column 124. For example and without limitation, the inner column 122 may include a plurality of conventional snap buttons. As a snap button approaches the aperture 130 of the outer column 124, a biasing member of the snap button causes the snap button to engage the through aperture 130, thereby locking the inner and outer columns in a secured position.

In some embodiments, the top platform 108 includes a support pad 116 for supporting a portion of an EV battery. In some embodiments, the top platform 108 is comprised of a metallic material and the support pad 116 is comprised of an elastomeric material, such as rubber. The support pad 116 material may be an electrically insulating material such that electric charge is prevented from transferring from a supported EV battery to the cart side assembly 100. The support pad 116 material may be a cushioning material that absorbs impact and vibration.

The top platform 108 may also include at least one threaded hole 138 (see FIG. 1C) configured to accept a threaded locator pin 200 (see FIGS. 1A-1B, but described in greater detail below). The support pad 116 includes at least one hole (not referenced) corresponding to the at least one threaded hole 138 such that the threaded locater pin 200 is threaded through the hole in the support pad 116 and into the threaded hole 138 (engaging the interior threads) of the top platform 108 of the inner column 122.

In some embodiments, the top platform 108 and/or support pad 116 is configured to spin or rotate with respect to the support column 114. In this way, the locator pin 200 may be variously positioned into a battery hole that is not located directly centered above the support column 114 of the battery cart side assembly 100. In addition, some batteries have bracket assembly surrounding the battery's body (e.g., for use in securing the battery within the vehicle), and the locator pin 200 may be configured to be received within a corresponding/mating aperture in the battery's bracket assembly and/or the locator pin 200 may be rotated as previously mentioned so as to align with the corresponding aperture in the battery's bracket assembly or within the battery itself.

With continued reference to FIGS. 1A-C, the battery supports 104 and 106 are slidably positioned to an infinite number of locations along the crossbar 102. In the illustrated example, a saddle (bracket) 119 is provided on the bottom surface 117 of the base 112 and the saddle 119 defines a passage 118 that is complementary in shape to and configured to receive the crossbar 102. As illustrated in the exemplary embodiment of FIG. 1B, the crossbar 102 includes a rectangular-shaped cross-section and extends through the correspondingly shaped rectangular passage 118. The bottom wall of the saddle 119 supports the crossbar 102 such that the crossbar 102 is engaged between the saddle 119 and the bottom surface 117 of the base 112. In some embodiments, the bottom wall of the saddle 119 includes a threaded bore (occluded by tightening knob 140), that is configured to receive a threaded tightening knob 140 for securing the crossbar 102 in the passage 118. That is, threading the tightening knob 140 through the passage aperture urges a portion of the threaded knob 140 in frictional contact with the crossbar 102, restricting sliding movement of the crossbar 102 within the passage 118. While the crossbar 102 is illustrated as a rectangular beam, it is to be appreciated that other shapes and fills are contemplated. Furthermore, the crossbar 102 may be solid or hollow, and have any desirable cross-section. In some embodiments, the crossbar 102 is substantially cylindrical in shape.

In some embodiments, each support 104, 106 includes a set of locking casters 180 (or wheels) secured in a spaced apart relationship to a bottom surface 117 of the base 112 to facilitate movement of the cart assembly 100. With reference to FIGS. 1A and 1B, the locking casters 180 are attached to the base 112 via at least one fastener, e.g., bolt 182. The locking casters 180 may be selectively locked in place to restrict movement of the battery cart side assembly 100. That is, a caster 180 may include a lever lock 183 selectively actuatable by a user of the assembly 100. The locking casters 180 support the elongated base 112 such that the connected crossbar 102 is raised in relation to the ground allowing legs of other shop equipment, e.g., a mobile hoist, to slide under the crossbar 102 without interference.

Figure 2:
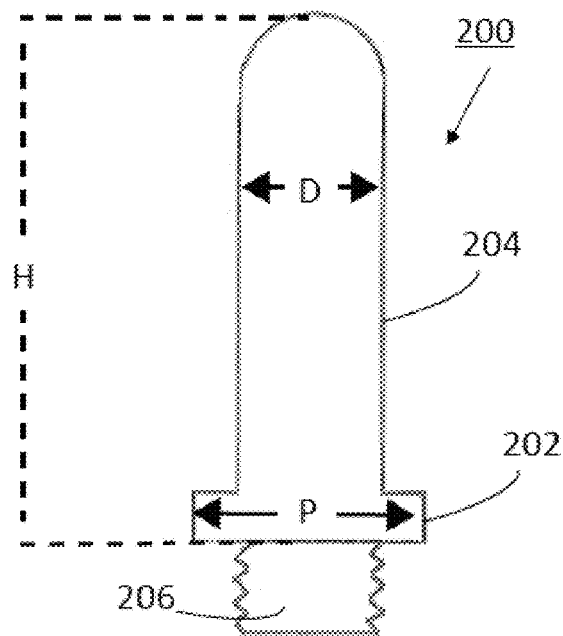
FIG. 2 illustrates an exemplary locator pin in accordance with the present disclosure.

With specific reference to FIGS. 1A, 1B and 2, the battery cart side assembly 100 is configured to receive at least one locator pin 200 configured to attach to the top platform 108 and extend normal thereto. It is to be appreciated that a platform 108 associated with each battery support 104 and 106, may each have an associated locator pin on the top platform. However, the use of the locator pin 200 may be optional, i.e., a locator pin 200 may be used with one battery support 104 and not the others (106). The locator pins 200 help guide an EV battery 300 to a desired position as it is lowered onto the cart assembly 100. The locator pins 200 include a set of bottom threads 206 that are received by the internal threads of the at least one threaded hole 138 of the top platform 108. The locator pin(s) 200 is/are an optional feature and, in some examples, the battery supports 104, 106 are provided without the locator pins 200.

Figures 3A, 3B:
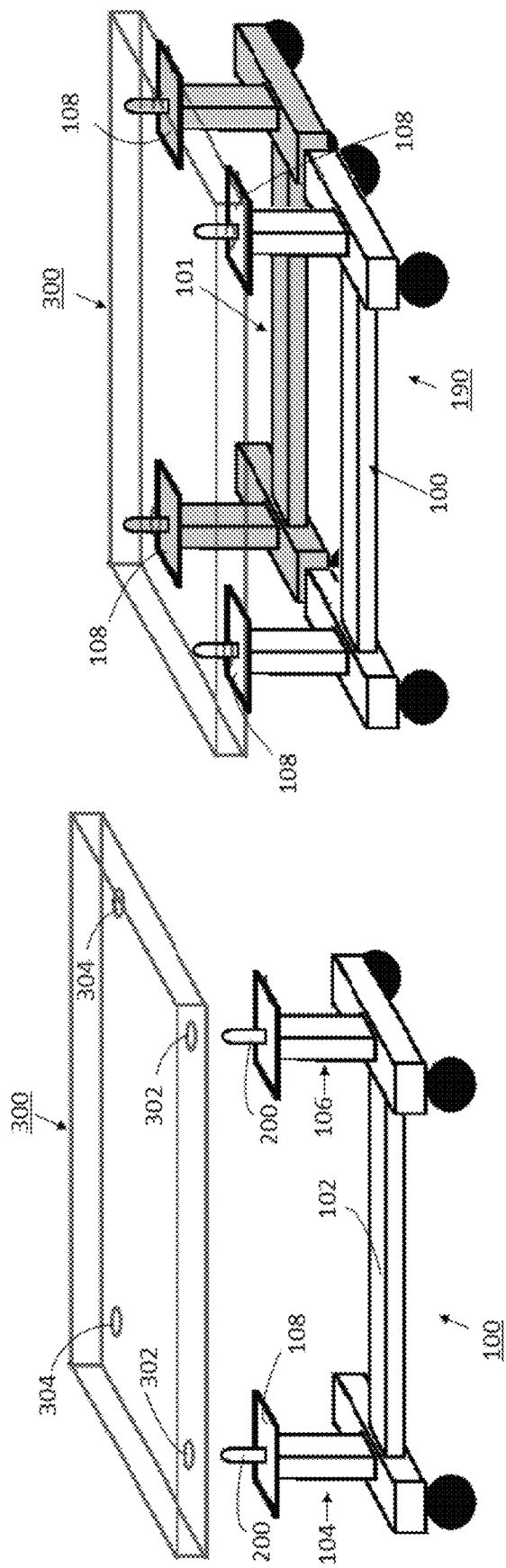
FIG. 3A illustrates an EV battery before being lowered onto the exemplary cart side assembly of FIG. 1A.
FIG. 3B illustrates the EV battery engaged with a pair of the cart side assemblies of FIG. 1A.

With reference to FIGS. 2-3B, each locator pin 200 has a height H, ranging from about 0.5 inch to about 5.0 inches, including 0.75, 1.0, 1.25, 1.5, 1.75, 2.0, 2.25, 2.5, 2.75, 3.0, 3.25, 3.5, 3.75, 4.0, 4.25, 4.5, 4.75, 5.0 inches and any value there between. However, it is to be appreciated the height of the locator pin 200 is non-limiting, and that any height H may be chosen such that the locator pin 200 engages a complementary battery locator hole 302 of an EV Battery 300 when connected to the top platform 108. Each locator pin 200 also has a diameter D, selected to correspond to a diameter B of a battery locator hole 302 allowing for the locator pin 200 slidably engage the battery locator hole 300. That is, the locator pin 200 has a substantially cylindrical body 204 with a diameter D, that engages the battery 300, such that the battery 300 is in a desired position with respect to the cart assembly 100. It is to be appreciated that the shape of the locator pin 200 is not limiting, rather the locator pin 200 shape and profile is may be configured to correspond to the shape of the batter locator hole 302. For example, if the battery locator hole 302 is substantially rectangular in shape, a locator pin 200 may have a cross-section that is complementary to the rectangular shape locater hole 302.

In some embodiments, each locator pin 200 includes a base flange 202 with a diameter P that is greater than the diameter D of the cylindrical body 204. In some embodiments, the base flange 202 is shaped to receive a tool, e.g., square or hexagonal for receiving a standard wrench. The base flange 202 enables a tool to tighten the locator pin 200 for securing it to the top platform 108.

In some embodiments, the body 204 of the locator pin 200 is made of a polymer material, for example and without limitation an elastomeric material such as rubber. The locator pin material may be an electrically insulating material such that electric charge is prevented from transferring from a supported battery to the cart side assembly 100. The locator pin material may also be a cushioning material that absorbs impact and vibrations.

FIGS. 3A-3B illustrate an EV battery 300 being lowered onto a cart side assembly 100, and an EV battery 300 supported by two cart side assemblies 100, 101 respectively. As shown in FIG. 3A, each locator pin 200 of the cart side assembly 100 is positioned to engage locator holes 302 located on the bottom surface of the EV battery 300. One cart side assembly 100 is generally configured to support one side of a battery 300. A second cart side assembly (101), similar to or identical to cart side assembly 100, is positioned to engage the other side of the battery, i.e., about the additional locator holes 304. That is, a battery support (e.g., 104, 106) is positioned under each corner of the EV battery 300. Once the battery 300 is lowered onto the each of the four top platforms 108 (facilitated by a locator pins 200) the two battery cart side assemblies 100, 101 work together to comprise a battery cart 190 to transport the battery 300. In some embodiments, the second cart side assembly 101 is a mirror image of the first side assembly 100.

As briefly noted above, the battery supports 104, 106 of the cart side assembly 100 are movable and repositionable along the crossbar 102, and in some embodiments, may be completely removed from the crossbar 102. This allows for compact storage of each cart side assembly 100 when the cart is not needed. Similarly, a shop may have many crossbars 102 each of varying lengths for optimal spacing of a particular EV battery size. In this manner, battery carts comprised of cart side assemblies 100 described herein are utilizable with and may accommodate many different types and sizes of batteries.

Figure 4B:
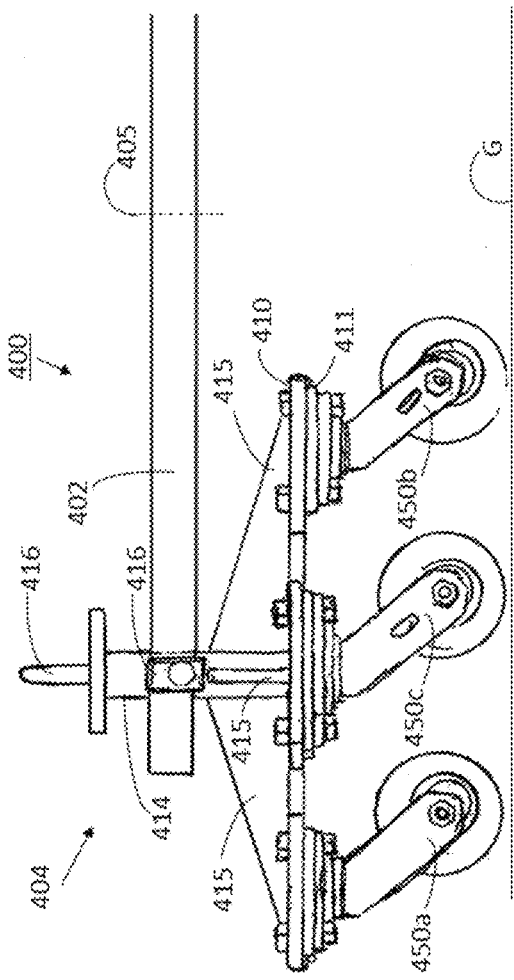
FIG. 4B illustrates a partial side view of the battery cart side assembly of FIG. 4A.
Figure 4A:
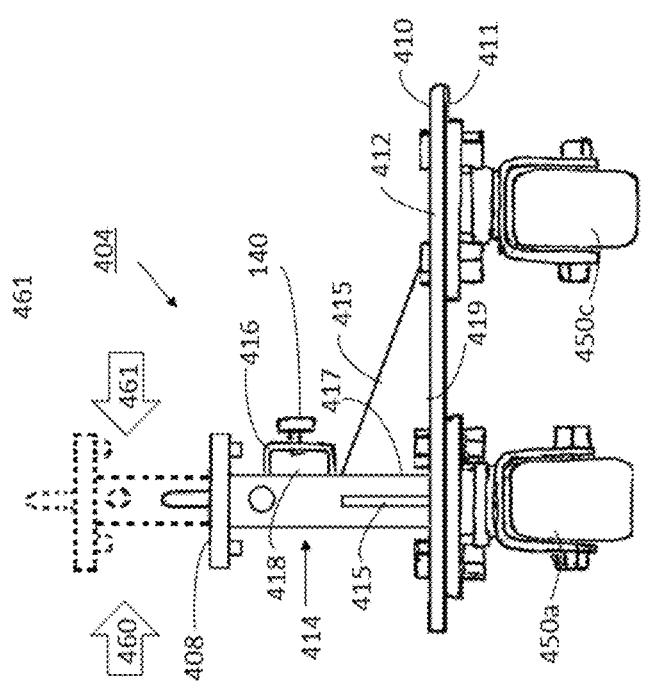
FIG. 4A illustrates a front view of another exemplary battery cart side assembly in accordance with the present disclosure.
Figure 4C:
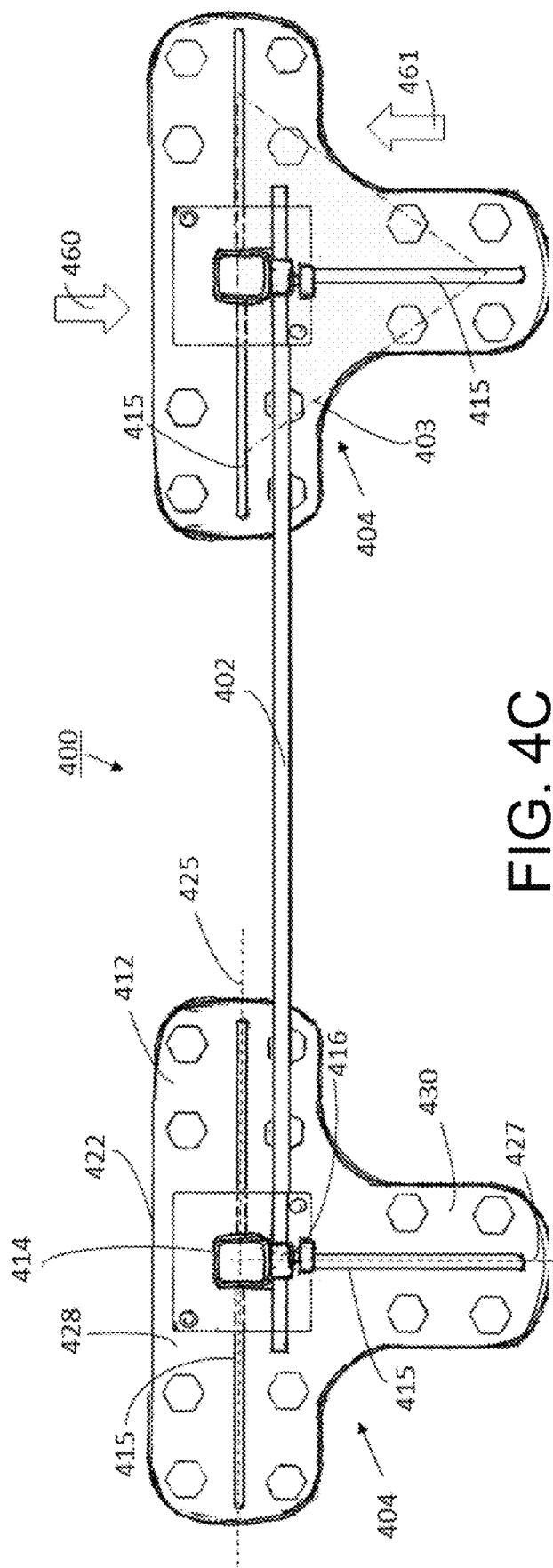
FIG. 4C illustrates a top view of the battery cart side assembly of FIG. 4A.

FIGS. 4A-4C illustrate a front view, partial side view, and top view, respectively, of another exemplary embodiment of a battery cart side assembly 400, according to one or more embodiments of the present disclosure. Similar to the side assembly 100, 101 discussed above, the side assemblies 400 may be used in pairs to support and transport an EV battery, where each side assembly 400 is independently movable relative to the other side assembly 400. That is, each side assembly 400 may be positioned on opposite sides of a vehicle lift and then quickly and easily moved into position under a left and right side of an EV battery that is being lowered down (on a lift) from beneath a vehicle. Like the side assemblies 100, the side assembly 400 is generally composed of structurally rigid materials (except as otherwise provided herein) including by not limited to metal Each side assembly 400 includes a rigid crossbar 402 that spans and removably connects at least two spaced apart battery supports 404. The spacing of the battery supports 404 is based on the dimensions of the EV battery it is configured to support. That is, the battery supports 404 may be positioned anywhere along a length of the rigid crossbar 402, so that the side assembly 400 may accommodate EV batteries of different sizes. Like the battery supports 104, 106 of the side assemblies 100, each battery support 404 of the side assembly 400 includes a top platform 408, a base 412, and a support column 414 that interconnects the top platform 408 and the base 412. The crossbar 402 may be adjustably connected to the support column 414 of each side assembly 400, which thereby enhances stability of the spaced apart battery supports 404 of each side assembly 400 when loaded, as compared to examples where the crossbar is mounted at a lower position closer to the ground/floor. In the illustrated example, a saddle or bracket 416 is connected to an upper portion of the support column 414 for receiving the crossbar 402. The saddles 416 each define a passage 418 that is complementary in shape to and configured to receive, the crossbar 402. As illustrated, the crossbar 402 includes a rectangular-shaped cross-section and extends through the correspondingly shaped (rectangular) passage 418. A shaped wall of the saddle bracket 416 defining the passage 418 supports the crossbar 402. In some embodiments, the shaped wall of the saddle bracket 416 includes a threaded bore (occluded by tightening knob 140), that is configured to receive a threaded tightening knob 140 for securing the crossbar 402 in the passage 418. That is, threading the tightening knob 140 through the passage aperture urges a portion of the threaded knob 140 in frictional contact with the crossbar 402, restricting sliding movement of the crossbar 402 within the passage 418. While the crossbar 402 is illustrated as a rectangular beam, it is to be appreciated that other shapes and fills are contemplated. Furthermore, like crossbar 102 the crossbar 402 may be solid or hollow, and have any desirable cross-section. Location of the passage 418 and tightening knob 140 on the support column 414 may provide easier access thereto, facilitating positioning of the battery support 404 along the crossbar 402.

In the illustrated embodiment, connection of the rigid crossbars 402 to the support column 414 is made between each battery support 404 and base 412.

Furthermore, the illustrated embodiment shows an example where the crossbar 402 has a rectangular cross-section, with a long axis 405 (i.e., here the long axis 405 corresponds with the height of the cross bar 402) of the rectangular cross-section normal to the ground G. This normal orientation of the long cross-section axis 405 enhances the strength and its opposition against a downward force as opposed to embodiments wherein the long axis of the rectangular cross-section is horizontal with the ground. This orientation of the crossbar 402, together with attaching the crossbar 402 at the upper portion of the support column 414 enhances stability of the battery cart comprised of side assemblies 400.

As shown in the front view of FIG. 4A, the exemplary side assembly 400 may be asymmetrical, rather than symmetrical as is the case with the exemplary embodiment side assembly 100 of FIG. 1B. In the illustrated example, the side assembly 400 has an interior facing side 460 and an exterior facing side 461. By interior facing side 460, it is meant that the side assembly 400 has a side 460 that is adjacent to an area under a battery supported by the side assembly. When two side assemblies 400 are supporting a battery, each side assembly 400 is a mirror image of the other, with each interior facing side 460 facing toward one another to an interior volume of the entire cart assembly, discussed in greater detail below. By exterior facing side 461, it is meant that the side assembly 400 has a side 461 that faces away from the interior volume of the cart assembly. Accordingly, during an example use of the side assemblies 400, the interior facing sides 460 will face towards a scissor lift as the scissor lift lowers the battery from the vehicle underside onto the side assemblies 400.

In some embodiments and as illustrated, the saddle bracket 416 is attached to the support column 414 on the exterior facing side 461. This arrangement provides easy access to the threaded tightening knob 140, enabling one to adjust the position of each support 404 along the crossbar 402 when placing an EV battery on the cart side assemblies 400. In other embodiments, however, the saddle bracket 416 may be attached elsewhere on the support column 414, for example, on the interior facing side 460 as placement of the crossbar 402 on the interior side may also have benefits.

The battery supports 404 each include, a top platform 408, a base 412, and a support column 414 connecting the top platform 408 and base 412. The support column 414 is generally normal to a substantially planer top surface 410 of the base 412. In some embodiments, the column 414 is attached to the base 412 by fasteners, e.g., bolts. In other embodiments, the column 414 is attached to the base 412 by welding or other attachment means and methods known in the art. In some embodiments, the support column 414 is in the center of the base 412. In other embodiments, and as illustrated in FIGS. 4A-C, the support column 414 is positioned along an axis 425. In the illustrated example, the axis 425 at which the support columns 414 are positioned is off-set from and substantially parallel to the crossbar 402, and, as further described below, the axis 425 is aligned with at least some of the castors/wheels.

The base 412 may comprise a substantially planer plate with a top surface 410 and a bottom surface 411. The top surface 410 of the base is configured to secure one end (i.e., a lower end) of the support column 414, so that the support column 414 may extend normal thereto upward towards the top platform 408. In some embodiments, the column 414 is attached to the base 412 by fasteners, e.g., bolts. In other embodiments, the column 414 is attached to the base 412 by welding or other attachment means and methods known in the art. In some embodiments and as illustrated, at least one support fin 415 is provide which aids in the connection of the base 412 to the support column 414. The support fin 415 also aids in maintaining the structural stability of the column 114 so that it remains in its normal position under a load (e.g., when a battery is being supported by the side assembly 404). The support fin 415, includes a vertical edge 417 that abuts and connects to the support column 414 and a horizontal edge 419 that abuts and connects to the top surface 411. In the illustrated example, a pair of support fins 415 are provided on each column 414, with a first support fin 415 extending from a front side of the column 414 along the axis 425 and a second support fin 415 extending from a rear side of the column 414 along the axis 425.

The bottom surface 411 of the base 412 is configured to receive a plurality of casters (or wheels) 450a-c. In the exemplary embodiment of FIGS. 4A-C, the bottom surface 411 is configured to receive three spaced apart casters 450a-c. The casters 450a-c may be attached to the base 412 by any means known in the art, for example and without limitation, casters 450 may be secured to the base via a plurality of fasteners (bolts, screws) that pass through apertures in the base 412. As described in greater detail below, the casters 450a-c may be arranged in a tri-pod or triangular manner. For example, each caster 450a-c may be centered about a point on an imaginary triangle 403. This tri-pod arrangement allows for each support 404 to stand up on its own and be movable on its wheels. For example, when crossbar 402 is removed such that the supports 404 of one side assembly 400 are unfixed from each other and independently movable relative to each other, each support 404 may stand upright on its casters 450a-c. In some embodiments, like the embodiment for FIG. 1 having only 2 wheels per sport, the support would fall on its own and create an obstruction on the shop floor. Furthermore, the tri-pod arrangement of casters 450a-c also increases the stability of the cart assembly. If one side assembly 400, while supporting the heavy EV battery (>1000 lbs) hits an obstruction, the tri pod arrangement of casters 450a-c will maintain support and inhibit buckling of the entire cart assembly. In the illustrated example two of the castors (i.e., caster 450a, 450b) are positioned along the axis 425, with the other castor (i.e., caster 450c) being positioned offset from the axis 425 and on the other side of the crossbar 402. As shown in FIG. 4B, all three of the casters 450a-c are positioned and spaced equidistantly when evaluated and measured along an axis, such as the axis 425 or along an axis of the crossbar 402; and, with reference to FIG. 4A, the distance existing between the caster 450a and the caster 450c is the same as the distance existing between the caster 450c and the caster 450b (which is obscured from view in FIG. 4A). With the casters 450a-c arranged in a tripod configuration, for example, on the imaginary triangle 403, the first and second castor 450a,450b are provided on the axis 425 and do not extend inward into the unobstructed space defined between the interior facing sides 460 (and/or beyond the interior facing edges 422). This tri-pod arrangement provides enhanced stability for each support 404, such it may stand up on its own and have other supports 404 stacked thereupon, but to also ensure that a single support 404 is inhibited from buckling underneath the assembled cart when supporting a battery if it hits (runs into) an obstruction, while at the same time providing an unobstructed space between assemblies 400 within which a scissor lift may be provided to lower the battery onto the battery cart as described herein.

Figure 5:
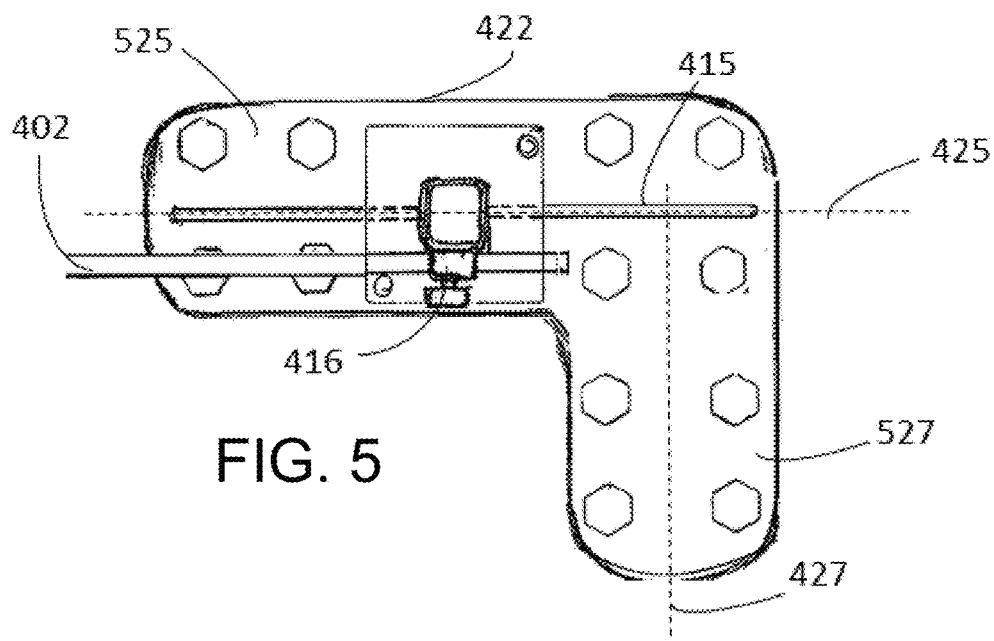
FIG. 5 illustrates a top view of another exemplary battery cart side assembly battery support in accordance with the present disclosure.

In some embodiments and with reference to FIGS. 4C and 5, the base 412 has a first axis 425 and corresponding first axial portion 428 that is substantially parallel to the crossbar 402 and a second axis 427 and corresponding second axial portion 430 that extends at an angle from first axis 425. While the exemplary embodiments show the axes 425 and 427 in a perpendicular arrangement, a 90-degree angle is not necessary. That is, for example and without limitation, the second axial portion 430 may extend from the first axial portion 428 at an angle of less than or greater than 90 degrees. In this embodiment, a third support fin 415 is provided that extends along the second axial portion 430 along the second axis 427. Thus, one or more support fins 415 may attach to the base 412 in line with either the first axis 425 and/or second axis 427.

FIGS. 4A-4C illustrate an exemplary T-shaped/triangle embodiment. FIG. 5 illustrates an exemplary embodiment incorporating an L-shaped configuration of a battery support 404. In the L-shaped configuration shown in FIG. 5, the first axis 425 corresponding with first axial portion 428 is substantially perpendicular to the second axis 427 and corresponding second axial portion 430. In the T-shaped exemplary embodiment of FIGS. 4A-4C, the second axial portion 430 also bisects first axial portion 428. That is, a second axial portion 430 the plate 412 extends centrally outward from the exterior facing side 461 and along the second axis 427 and perpendicular to the first axis 425. In the L-Shaped exemplary embodiment of FIG. 5, the axes 425 and 427 form an "L" shape having a first leg 525 (first axial portion) along the first axis 425 and a second leg 527 (second axial portion) along axis 427 where the second leg 527 extends from an end of the first leg 525. In either case, the first axial portion 428 substantially parallel to the crossbar 402 provides an interior facing edge 422 of the base 412 to also be substantially parallel to the crossbar 402 and first axis 425. In this way and with the support column 414 placed along the first axes 425, when two battery cart side assemblies 400 are supporting an EV battery, the floor space directly under the EV battery is substantially unobstructed and free of any protruding portions of the batter cart side assemblies 400 extending into such floor space (such as the base 412 and the castors 450 thereon), to thereby maximizing unobstructed space between side assemblies 400 and providing ample room for maneuvering equipment (e.g., a scissor lift) between each side assembly 400.

It is to be appreciated that while T and L-shaped bases 412 are illustrated, other shapes for a base 412 are also considered. For example and without limitation, the base 412 be V shaped, wherein one leg of the V is substantially parallel to the crossbar 402 and the other leg of the "V" shaped base extends at an angle therefore. Furthermore, the number of axial portions 428,430 of a base 412 is not limiting. While two axial portions are shown with respect to the T-shaped embodiment of FIG. 4C and the L-shaped embodiment of FIG. 5, a base 412 may have more than two axial portions. For example and without limitation, a base 412 may have having a "K" shape, wherein the back of the "K" is substantially parallel to the crossbar 402 and each of the legs of the K extend at angles therefrom; or, for example and without limitation, a base 412 may have having a, "U" shape (or "n" shape), wherein the bottom side of the "U" (or top side of the "n") is substantially parallel to the crossbar 402 and each of the legs extend at approximately right angles from ends of the bottom/top side. In these examples, each of the bases 412 may have four or more sets of casters, positioned at each of the ends of the sides/legs.

With reference to FIGS. 4A-4C each battery support 404 includes multiple spaced apart casters 450a-c (wheel assemblies) attached the bottom surface 411. Each caster 450a-c is generally positioned along the first axes 425 or second axis 427. In the exemplary embodiment of FIGS. 4A-4C, three casters 450a-c are located on the bottom surface 411 of the base 412. Two casters 450a and 450b are positioned along the first axis 425 that is substantially parallel to the crossbar 402 and a third caster 450c is position along the second axis 427. In some embodiments, and as illustrated in FIG. 4C, each caster 450a-c is centered on a corresponding point of an imaginary triangle 403. In other embodiments, such as the exemplary embodiment of FIG. 5, casters 450a and 450b are located along the first axial portion 525 along first axis 425 and two casters are located on the second axial portion 527 along axis 427, where at least one caster thereof is located at the intersection between axis 425 and 427. For example, the first caster 450a is positioned at an end of the first axial portion 525 (and along first axis 425), the third caster 450c is positioned at an end of the second axial portion 527 (and along second axis 427), and the second caster 450b is positioned at an intersection between the first and second axial portions 525,527 (and axes 425,427). In some embodiments, each caster 450a-c has a fixed orientation in relation to the base 412. In other embodiments, each caster 450a-c may rotate or swivel in relation to the base 412. The casters 450a-c are positioned such that they do not extend beyond the bounds of the edge 422 of the base 412. In other words, the interior edge 422 is part of and defines an interior plane 623 extending upward from the ground surface (see FIG. 6B). Each interior plane of each side assembly 400 defines an open distance between each assembly 400 and provides room for equipment 680 (e.g., lift cart).

As noted above with respect to the discussion of axial portions above, when two battery cart side assemblies 400 are supporting an EV battery, the casters 450*a-c* are placed such that the casters 450*a-c* do not interfere with the movement of other equipment (in the space between each side assembly 400). Thus, no part of the side assemblies 400 protrudes or extends beyond its associated interior plane 623 and, in this manner, a space 655 between interior planes 623 is an unobstructed space 655 within which equipment such as scissor jack 680 may be positioned entirely unimpeded by the battery cart. Thus, the side assemblies 400 are designed such that the bases 412 and the castors 450 thereon do not extend beyond the planes 623 and into the unobstructed space 655.

The support column 414 may be a telescoping support column similar in some respects to the support column 114 having inner 122 and outer 124 columns in sliding engagement and able to receive a position pin 134. Thus, the support column 414 may be best understood with reference to support column 114. Furthermore, each support column 414 includes a top platform 408 similar to top platform 108 and support pad (not illustrated) similar to support pad 116 which may also be understood with respect thereto, including but not limited to the ability to receive a locator pin 200.

In some embodiments, each battery support 404 may be stackable on each other, such that you would have a vertical stack of two or more battery supports 404. With casters 450*a-c* on the bottom most battery support 404, the stacked battery supports 404 may be transported as a single unit. To vertically stack the battery supports 404, each battery support 404 may be disconnected from its associated support 404 by removing the cross bar 402 interconnecting the two supports 404. In addition, the battery supports 404 may include a hole on the base plate 412 that is sized to receive the pin 200 of another of the battery supports 404. Alternatively, the hole may be a shaped opening configured to receive a portion of the support column 414. Thus, battery cart and its side assemblies 400 may be easily disassembled and stowed within a minimal footprint, by stacking the plurality of supports 404 one on top of another (i.e., a stack of 4 supports 404), and then resting the crossbars 402 against a wall or on a shelf.

Figure 6A:
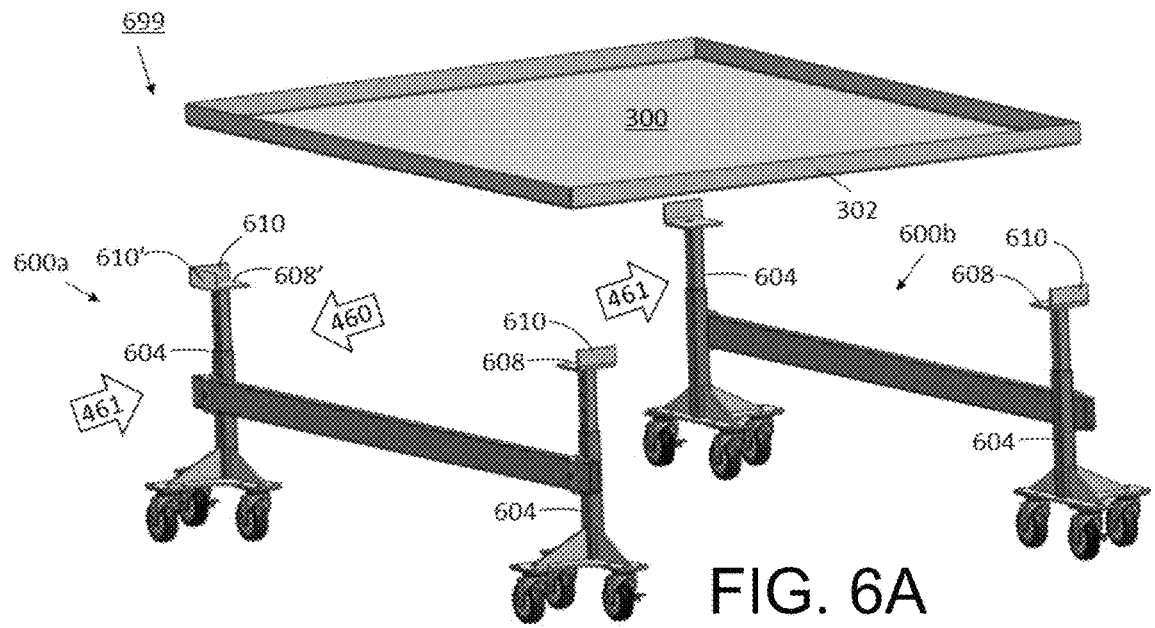
FIG. 6A illustrates a perspective view an EV battery being lowered onto exemplary battery cart side assemblies.
Figure 6B:
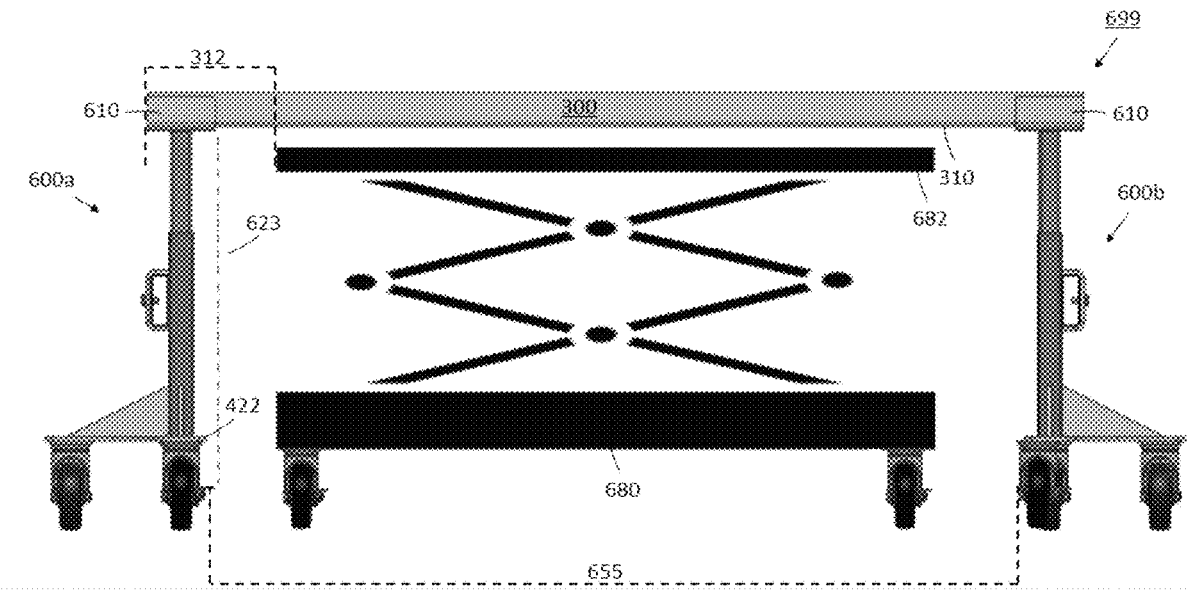
FIG. 6B illustrates a front view of the EV battery positioned on the battery cart side assemblies of FIG. 6A.
Figure 6C:
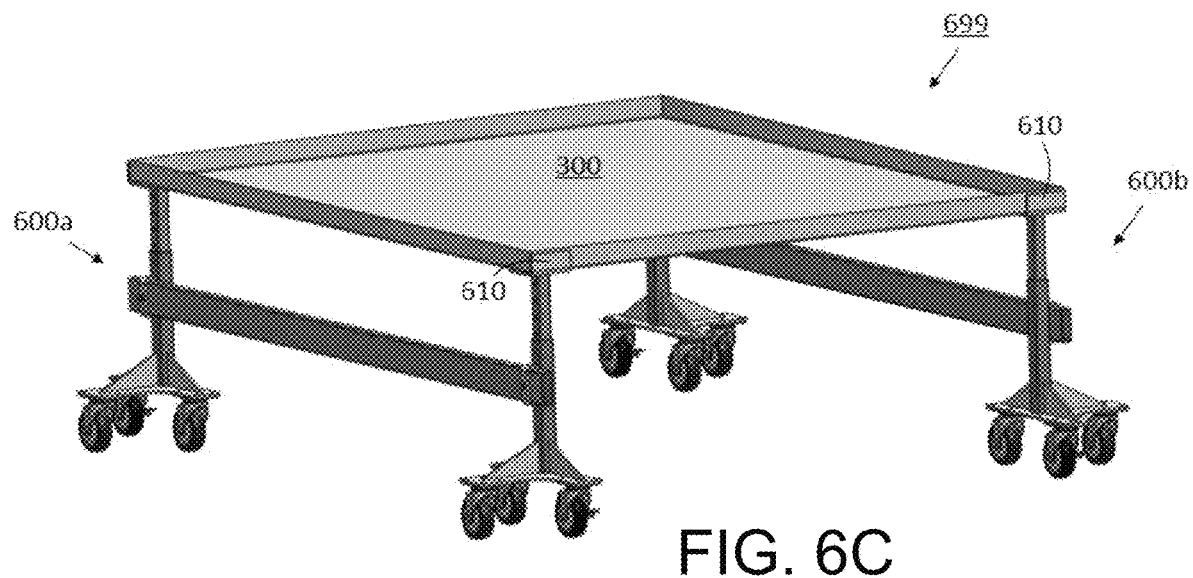
FIG. 6C illustrates a perspective view of the EV battery positioned on the battery cart side assemblies of FIG. 6A.
Figure 7:
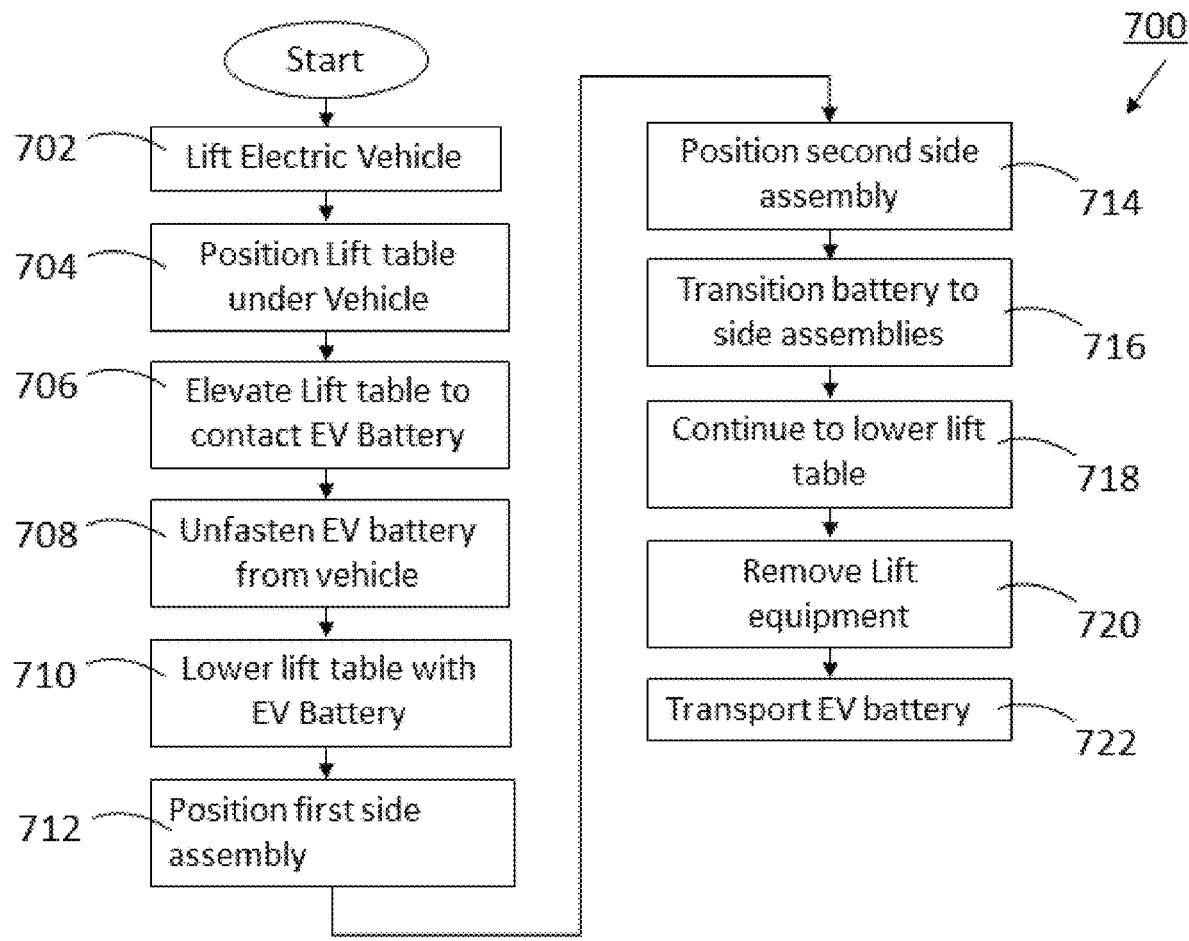
FIG. 7 is a flow chart of an exemplary method for removing an electrical vehicle battery using a battery cart assembly in accordance with the present disclosure.

FIGS. 6A-6C illustrate another exemplary embodiment of a battery cart comprising a pair of side assemblies 600*a*, 600*b*. The side assemblies 600*a, b* may be similar in some respects to the side assembly 400 and therefore may be best understood with reference thereto. Unlike the side assembly 400, the side assembly 600 has a top plate/platform 608 with at least one top sidewall 610. In the illustrated embodiment, each support 604 has a top plate 608 with one top side wall 610 extending vertically upward from the top plate 608. In other embodiments, each support as a top plate 608' with two top sidewalls 610, 610' vertically extending from the plate 608' at a corner thereof corresponding with a corner of the battery to be supported thereon. In other embodiments, some supports have a top plate 608 with one sidewall 610 while others may have a top plate 608 with two top sidewalls 610, 610'. It is to be appreciated these exemplary configurations are not limiting, and that some supports may even include a top plate 408 without a sidewall 610 and may or may not include a locator pin 200 as described herein.

Each sidewall 610, 610' extends in a substantial vertical direction from the top plate 608' and is configured to abut the edge wall 302 of EV battery 300. That is, when the EV battery 300 is supported by the side cart assemblies 600*a,b*, the sidewalls 610, 610' prevent the EV battery 300 from sliding off the top platforms 608, 608' and help align the EV battery as it is being lowered onto the side assemblies 600*a*, 600*b*. In some embodiments, the plate 608' with corner sidewalls 610, 610' further comprises an aperture for receiving locator pin 200 as described herein. The sidewalls 610, 610' are optional and in some examples, the either or both of the sidewalls 610, 610' are not provided on the top platforms 608, 608'. Thus, each top plate 408 may have none or any one or more of the locator pin 200, the sidewall 610, and/or the sidewalls 610'.

With reference to FIGS. 67, described and illustrated is an exemplary method 700 for positioning an EV battery on a battery cart assembly 699, composed of at least two battery cart side assemblies 600*a,b*. The method 700, may be practiced in a mechanics garage or work shop where electric batteries are installed/removed from vehicles. The EV vehicle may be elevated on a vehicle lift at 702 (i.e., elevating or lifting the vehicle on a lift 702) such that the mechanic may access the underside of the vehicle including the electric battery. To remove the electric battery, a separate piece of equipment 680 with a lift table 682 will be positioned under the vehicle at 704 (i.e., positioning equipment such as a lift with lift table under the lift 704). In some embodiments, the equipment 680 is a scissor lift cart/machine equipped with a stable platform 682 that may be elevated.

The lift table 682 of the equipment 680 is elevated upwards at 706 to make contact with the EV battery while it is attached to the elevated vehicle (i.e., elevating or lifting the lift table 706). With the lift table 682 in an elevated position, the mechanic will unfasten (detach) the EV battery from the supported vehicle at 708, whereby the EV battery would be supported on the lift table 682 of the scissor lift 680 (i.e., unfastening/unsecuring/unconnecting the battery from the vehicle 708).

With the EV battery supported by the elevated lift table 682, the lift equipment 680 may lower the lift table 682 with the battery supported thereon a distance at 710 (i.e., lowering the lift table supporting the battery 710). As the lift table 682 and EV battery are lowered, perception of the EV Battery for the positioning the side assembling may increase. At a certain point during the lowering of the battery, a first side assembly, 600*a* of the battery cart assembly 699 is independently positioned under the EV battery 300 on a first side of the EV battery at 712 (i.e., positioning first side assembly at first side of battery 712). That is, the lift table 682 does not contact the entire bottom surface 310 of the EV battery 300, and there is a distance 312 on each side of the EV Battery 300 that, when the EV battery 300 is lowered may be lowered into contact with the top platforms 608 of a side assembly support 604. At 714, the second side assembly 600*b* of the battery cart assembly 699 is independently positioned under the EV battery 300 on a second side of the EV battery (i.e., positioning second side assembly at second side of battery 712). While the method illustrates that blocks 712 and 714 are done sequentially, it is to be appreciated that 712 and 714 may be done simultaneously. That is, both side assemblies 600*a*, 600*b* may be positioned under the lowering EV battery 600 at the same time. Nevertheless, the side assemblies 600*a*, 600*b* are movable and positionable independent of each other.

Furthermore, it is to be appreciated that the design of the cart assembly 699 allows for the 712 and 714 to be performed sequentially or simultaneously. That is, each side assembly 600*a*, 600*b* is such that it is independently movable and able to stand (maintain its position) on its own. In this way, a single mechanic may be able to perform a battery removal on his own in an efficient manner. When the EV battery is at a lowered position and at a height where a side assembly may just be able moved under the EV battery 300, the mechanic may position the first side assembly 600*a*, under the battery. The mechanic may lock the casters 650 of the first side assembly, leave the area, retrieve a second side assembly 600*b* from a storage location, and independently position the second side assembly under the battery 300. The mechanic may then attend to the lift equipment 680 and at 716, fully transition the battery to the aligned/positioned side assemblies 600*a,b* (i.e., transitioning battery load from lift table to first and second side assemblies 716).

With the EV battery supported by cart assembly 699, the lift table 682 may continue to be lowered at 718 (i.e., continue lowering the lift table such that scissor lift may be moved from beneath the battery cart or vice versa 718). In this way, the battery 300 is set upon or dropped on each of the four corner supports 604 of the battery cart 699. With the lift equipment 680 no longer supporting the EV battery 300, the lift equipment 680 may be removed out from under the battery and cart 699 at 720 (i.e., removing lift equipment from beneath battery cart 720). Alternatively, the battery cart supporting the battery may be moved relative to the lift equipment while the lift equipment remains stationary in its previous position from where it was raised and lowered. Since the distance 655 (clearance) between the interior most portions of the cart is substantially maximized by the design of the cart 699, with interior planes 623 defining the unobstructed space 655 there-between, there is plenty of room under the EV battery 300 and floor space to move the lift equipment 680 from under the battery 300. With no obstruction under the battery cart assembly 699, the EV battery 300 may be transported around the shop to a desired location at 722 (i.e., transporting the battery 722). Thereafter, the battery may be removed from the battery cart, and then the battery cart side assemblies may be disassembled and stacked, with the battery supports stacked one on top of another as described above, and then stored for later use.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed is:

1. An electric vehicle battery cart assembly comprising:
   a first cart side assembly comprising two spaced apart battery supports movably positionable on a first crossbar, each battery support configured to receive and support an electric vehicle battery and having at least one caster; and
   a second cart side assembly, independently movable from the first cart side assembly and comprising two spaced apart battery supports positionable on a second crossbar and configured to receive and support the electric vehicle battery and having at least one caster,
   wherein the first cart side assembly and the second cart side assembly each have corresponding interior facing sides that face each other when positioned to receive the electric vehicle battery, each interior facing side defining a plane between which is defined an unobstructed open space.

2. The electric vehicle battery cart assembly according to claim 1, wherein the first cart side assembly is configured to support the electric vehicle battery on a first battery side and the second cart side assembly is configured to support the electric vehicle battery on a second battery side.

3. The electric vehicle battery cart assembly according to claim 1, wherein each battery support of the first and second cart side assemblies further comprises a base, a top platform, and support column connecting the base to the top platform, wherein the first crossbar interconnects the support columns of the first cart side assembly and the second crossbar interconnects the support columns of the second cart side assembly.

4. The electric vehicle battery cart assembly according to claim 3, wherein each top platform further comprises a locator pin extending substantially normal from the top platform, the locator pin is dimensioned to engage and align a corresponding aperture of the electric vehicle battery or a bracket assembly surrounding the electric vehicle battery.

5. The electric vehicle battery cart assembly according to claim 3, wherein each top platform further comprises at least one top wall extending in a substantially vertical direction from the top plate and is configured to abut an edge wall of the electric vehicle battery.

6. The electric vehicle battery cart assembly according to claim 1, wherein each battery support includes a telescoping support column, the telescoping support column including an inner column dimensioned and configured to fit in a sliding engagement with an outer column.

7. The electric vehicle battery cart assembly according to claim 1, wherein each battery support includes a telescoping support column, the telescoping support column including an inner column having a first end connected to a top platform and a second end dimensioned and configured to fit in a sliding engagement with an outer column, the outer column secured to and is substantially normal to a base.

8. The electric vehicle battery cart assembly according to claim 3 assembly according to claim 3, further comprising a support pad on a top surface of the top platform, the support pad composed of an elastomeric or electrically insulating material.

9. The electric vehicle battery cart assembly according to claim 1, wherein each battery support includes a set of three, spaced apart casters.

10. The electric vehicle battery cart assembly according to claim 9, wherein the set of three casters are in a spaced apparat tri-pod arrangement.

11. The electric vehicle battery cart assembly according to claim 1, wherein the first cart side assembly is a mirror image of the second cart side assembly.

12. The electric vehicle battery cart assembly according to claim 1, wherein each battery support includes a base having a first axial portion along a first axis, the first axis is substantially parallel to the crossbar and a second axial portion extending along a second axis, the second axis extends at an angle to the first axis.

13. The electric vehicle battery cart assembly according to claim 12, wherein the second axial portion is perpendicular to the first axial portion.

14. The electric vehicle battery cart assembly according to claim 12, wherein a first and second caster are mounted to a bottom surface of the base along the first axis and a third caster is mounted to the bottom surface of the base along the second axis.

15. The electric vehicle battery cart assembly according to claim 12, wherein the base has an interior edge substantially parallel to the crossbar.

\* \* \* \* \*